US010055689B2

(12) United States Patent
Nickel et al.

(10) Patent No.: US 10,055,689 B2
(45) Date of Patent: Aug. 21, 2018

(54) CALCULATING A RELATION INDICATOR FOR A RELATION BETWEEN ENTITIES

(71) Applicants: Maximilian Nickel, Cambridge, MA (US); Volker Tresp, München (DE); Xueyan Jiang, München (DE)

(72) Inventors: Maximilian Nickel, Cambridge, MA (US); Volker Tresp, München (DE); Xueyan Jiang, München (DE)

(73) Assignee: Siemens Aktiengesellschaft, München (DE)

( * ) Notice: Subject to any disclaimer, the term of this patent is extended or adjusted under 35 U.S.C. 154(b) by 576 days.

(21) Appl. No.: 14/680,232

(22) Filed: Apr. 7, 2015

(65) Prior Publication Data

US 2016/0300149 A1    Oct. 13, 2016

(51) Int. Cl.
*G06N 7/00* (2006.01)
*G06F 17/18* (2006.01)
*G06K 9/00* (2006.01)
*G06N 99/00* (2010.01)

(52) U.S. Cl.
CPC ............ *G06N 7/00* (2013.01); *G06F 17/18* (2013.01); *G06K 9/00* (2013.01); *G06N 99/005* (2013.01)

(58) Field of Classification Search
CPC .................................. G06N 7/00; G06F 17/16
See application file for complete search history.

(56) References Cited

U.S. PATENT DOCUMENTS

| 9,704,102 | B2 * | 7/2017 | Baraniuk | G06N 99/005 |
| 2013/0103371 | A1 * | 4/2013 | Huang | G06N 7/005 |
| | | | | 703/2 |
| 2014/0156231 | A1 * | 6/2014 | Guo | G06N 7/005 |
| | | | | 703/2 |

OTHER PUBLICATIONS

Jiang, Xueyan, et al. "Link prediction in multi-relational graphs using additive models." Proceedings of the 2012 International Conference on Semantic Technologies Meet Recommender Systems & Big Data—vol. 919. CEUR-WS. org, 2012.*
M. Nickel, X. Jiang, and V. Tresp, "Reducing the Rank in Relational Factorization Models by Including Observable Patterns," Advances in Neural Information Processing Systems 27, Curran Associates, Inc., pp. 1179-1187 (2014).

* cited by examiner

*Primary Examiner* — Eric Nilsson
(74) *Attorney, Agent, or Firm* — Lempia Summerfield Katz LLC

(57) ABSTRACT

A method is provided for calculating a relation indicator for a relation between entities based on an optimization procedure. The method combines the strong relational learning ability and the good scalability of the RESCAL model with the linear regression model, which may deal with observed patterns to model known relations. The method may be used to determine relations between objects, for instance entries in a database, such as a shopping platform, medical treatments, production processes, or in the context of the Internet of Things, in a fast and precise manner.

15 Claims, 4 Drawing Sheets

CALCULATING A RELATION INDICATOR FOR A RELATION BETWEEN ENTITIES

TECHNICAL FIELD

The embodiments relate to a method for calculating a relation indicator for a relation between entities.

BACKGROUND

Relational and graph-structured data has become ubiquitous in many fields of application such as social network analysis, bioinformatics, artificial intelligence, or factory processing. Therefore, learning from large-scale relational data is an increasingly important field.

As a consequence of increasing volume and complexity of data, scalability and modeling power become crucial for learning machine algorithms dealing with the large-scale relational data. Approaches involve for instance logical representations of the model (e.g., Inductive Logic Programming or Markov Logic Networks) or include a set of latent variables (e.g., the Infinite Hidden Relational Model or the Infinite Relational Model).

Latent variable models allow deducing unknown relationships hidden in the data. An important approach is tensor factorization, which is a generalization of matrix factorization to higher-order data. In the past years, tensor factorization methods have become popular for learning from multi-relational data.

SUMMARY AND DESCRIPTION

The scope of the present invention is defined solely by the appended claims and is not affected to any degree by the statements within this summary. The present embodiments may obviate one or more of the drawbacks or limitations in the related art.

According to a first aspect, a method for calculating a relation indicator for a relation between entities includes the acts of: (1) providing a measurement tensor X of measurement tensor components, $X_{ijk}$, with i, j=1 . . . N, including measurement data as relation indicators, wherein the relation indicator $X_{ijk}$ indicates the k-th relation between an i-th and a j-th of a number, N, of entities; (2) providing a rules tensor M of rules tensor components, Mijn, describing a prediction of an n-th rule; (3) calculating a weighting tensor of weighting tensor components, Wnk, indicating relative weights of the rules for the k-th relation between the entities; (4) calculating a relationship tensor R of relationship tensor components, Rabk, with a, b=1 . . . r, indicating relations between a set of a number, r, of properties of the entities; (5) calculating a transformation tensor A of transformation tensor components, Aia, describing the i-th entity via r latent properties, where the transformation tensor A, the weighting tensor W, and the relationship tensor R are calculated as the minimum solutions to the equation:

$$\min_{A,R,W} \|X_{ijk} - X'_{ijk}\|_F^2 + \lambda_A \|A\|_F^2 + \lambda_R \|R\|_F^2 + \lambda_W \|W\|_F^2,$$

with $\lambda_A$, $\lambda_R$, and $\lambda_W$ as Lagrange parameters and with result tensor components $X_{ijk}'$ of a result tensor X' given by:

$$X_{ijk}' = \Sigma_{a,b,n}(A_{ia}R_{abk}A_{bj}^T + M_{ijn}W_{nk}),$$

where $A^T$ is the transposed tensor corresponding to the transformation tensor A; and (6) calculating a value of the relation indicator for the k-th relation between the i-th and the j-th entity based on the result tensor component $X_{ijk}'$.

In an embodiment, the method further includes the act of generating at least one control signal, based on the predicted value of the relation indicator, for controlling an actuator, a sensor, a controller, a field device, and/or a display.

In an embodiment, a visual and/or acoustic signal is created based on the control signal.

In an embodiment, the method further includes: expanding the measurement tensor with additional measurement tensor components $X_{i(N+1)k}$ for i=1 . . . N, $X_{(N+1)jk}$ for j=1 . . . N and $X_{(N+1)(N+1)k}$, including measurement data as relation indicators between the (N+1)-th additional entity and the entities; and expanding the rules tensor with additional rules tensor components, $M_{i(N+)n}$ for i=1 . . . N, $M_{(N+1)jn}$ for j=1 . . . N and $M_{(N+1)(N+1)n}$; wherein a value of a relation indicator to be predicted is set to a predetermined value.

In an embodiment, the method further includes: monitoring a relation between at least two of the entities; and setting a value of at least one relation indicator based on the monitored relation between the at least two of the entities.

In an embodiment, at least some of the measurement data are provided by at least one sensor and/or are read out from at least one database.

In an embodiment, for calculating the result tensor an alternating least-squares method is used, wherein the transformation tensor, the relationship tensor and the weighting tensor are updated alternatingly until convergence.

According to a further aspect, a computer program for calculating a relation indicator for a relation between entities includes program instructions configured to, when executed: (1) provide a measurement tensor X of measurement tensor components, $X_{ijk}$, with i, j=1 . . . N, including measurement data as relation indicators, wherein the relation indicator $X_{ijk}$ indicates a k-th relation between an i-th and a j-th of a number, N, of entities; (2) provide a rules tensor M of rules tensor components, $M_{ijn}$, describing a prediction of an n-th rule; (3) calculate a weighting tensor W of weighting tensor components, $W_{nk}$, indicating relative weights of the rules for the k-th relation between the entities; (4) calculate a relationship tensor R of relationship tensor components, $R_{abk}$, with a, b=1 . . . r, indicating relations between a set of a number, r, of properties of the entities; (5) calculate a transformation tensor A of transformation tensor components, $A_{ia}$, describing the i-th entity via r latent properties, wherein the transformation tensor A, the weighting tensor W, and the relationship tensor R are calculated as the minimum solutions to the following equation:

$$\min_{A,R,W} \|X_{ijk} - X'_{ijk}\|_F^2 + \lambda_A \|A\|_F^2 + \lambda_R \|R\|_F^2 + \lambda_W \|W\|_F^2,$$

with $\lambda_A$, $\lambda_R$, and $\lambda_W$ as Lagrange parameters and with result tensor components $X_{ijk}'$ of a result tensor X' given by:

$$X_{ijk}' = \Sigma_{a,b,n}(A_{ia}R_{abk}A_{bj}^T + M_{ijn}W_{nk}),$$

where $A^T$ is the transposed tensor corresponding to the transformation tensor A; and (6) calculate a value of the relation indicator for the k-th relation between the i-th and the j-th entity based on the result tensor component $X_{ijk}'$.

According to a further aspect, a computer-readable, non-transitory storage medium includes stored program instructions configured to, when executed: (1) provide a measurement tensor X of measurement tensor components, $X_{ijk}$, with i, j=1 . . . N, including measurement data as relation indicators, wherein the relation indicator $X_{ijk}$ indicates a k-th relation between an i-th and a j-th of a number, N, of entities; (2) provide a rules tensor M of rules tensor components, $M_{ijn}$, describing the predictions of the n-th rule; (3) calculate a weighting tensor W of weighting tensor components, $W_{nk}$, indicating relative weights of the rules for the k-th relation between the entities; (4) calculate a relationship tensor R of relationship tensor components, $R_{abk}$, with a, b=1 . . . r, indicating relations between a set of a number, r, of properties of the entities; (5) calculate a transformation tensor A of transformation tensor components, $A_{ia}$, describing the i-th entity via r latent properties, wherein the transformation tensor A, the weighting tensor W, and the relationship tensor R are calculated as the minimum solutions to the following equation:

$$\min_{A,R,W} \|X_{ijk} - X'_{ijk}\|_F^2 + \lambda_A \|A\|_F^2 + \lambda_R \|R\|_F^2 + \lambda_W \|W\|_F^2,$$

with $\lambda_A$, $\lambda_R$, and $\lambda_W$ as Lagrange parameters and with result tensor components $X_{ijk}'$ of a result tensor X' given by:

$$X_{ijk}' = \Sigma_{a,b,n}(A_{ia}R_{abk}A_{bj}^T + M_{ijn}W_{nk}),$$

where $A^T$ is the transposed tensor corresponding to the transformation tensor A; and (6) calculate a value of the relation indicator for the k-th relation between the i-th and the j-th entity based on the result tensor component $X_{ijk}'$.

According to a further aspect, an apparatus for calculating a relation indicator for a relation between entities includes: (1) a measurement tensor module configured to provide a measurement tensor X of measurement tensor components, $X_{ijk}$, with i, j=1 . . . N, including measurement data as relation indicators, wherein the relation indicator $X_{ijk}$ indicates a k-th relation between an i-th and a j-th of a number, N, of entities; (2) a rules tensor module M configured to provide a rules tensor of rules tensor components, $M_{ijn}$, describing the predictions of the n-th rule; (3) a weighting tensor module configured to calculate a weighting tensor W of weighting tensor components, $W_{nk}$, indicating relative weights of the rules for the k-th relation between the entities; (4) a relationship tensor module configured to provide a relationship tensor R of relationship tensor components, $R_{abk}$, with a, b=1 . . . r, indicating relations between a set of a number, r, of properties of the entities; (5) a transformation tensor module configured to calculate a transformation tensor A of transformation tensor components, $A_{ia}$, describing the i-th entity via r latent properties, wherein the transformation tensor A, the weighting tensor W, and the relationship tensor R are calculated as the minimum solutions to the following equation:

$$\min_{A,R,W} \|X_{ijk} - X'_{ijk}\|_F^2 + \lambda_A \|A\|_F^2 + \lambda_R \|R\|_F^2 + \lambda_W \|W\|_F^2,$$

with $\lambda_A$, $\lambda_R$, and $\lambda_W$ as Lagrange parameters and with result tensor components $X_{ijk}'$ of a result tensor X' given by:

$$X_{ijk}' = \Sigma_{a,b,n}(A_{ia}R_{abk}A_{bj}^T + M_{ijn}W_{nk}),$$

where $A^T$ is the transposed tensor corresponding to the transformation tensor A; (6) a result tensor calculation module configured to calculate the result tensor X' of the result tensor components $X_{ijk}'$; and (7) a relation indicator calculation module configured to calculate a value of the relation indicator for the k-th relation between the i-th and the j-th entity based on the result tensor component $X_{ijk}'$.

In a possible embodiment, the apparatus further includes a control signal generation module configured to generate at least one control signal, based on the predicted value of the relation indicator, for controlling an actuator, a sensor, a controller, a field device, and/or a display.

In further embodiment, the apparatus further includes an output module configured to create a visual and/or acoustic signal based on the control signal.

In further embodiment, the apparatus further includes: a measurement tensor expansion module configured to: (a) expand the measurement tensor with additional measurement tensor components $X_{i(N+1)k}$ for i=1 . . . N, $X_{(N+1)jk}$ for j=1 . . . N and $X_{(N+1)(N+1)k}$, including measurement data as relation indicators between the (N+1)-th additional entity and the entities, and (b) set a value of a relation indicator to be predicted to a predetermined value; and a rules tensor expansion module configured to expand the rules tensor with additional rules tensor components, $M_{i(N+1)n}$ for i=1 . . . N, $M_{(N+1)jn}$ for j=1 . . . N and $M_{(N+1)(N+1)n}$.

In another embodiment, the apparatus further includes: a monitoring module configured to monitor a relation between at least two of the entities; and a setting module configured to set a value of at least one relation indicator based on the monitored relation between the at least two of the entities.

In another embodiment, the apparatus further includes a measurement module configured to provide at least some of the measurement data to the measurement tensor module.

In another embodiment, the apparatus further includes: at least one database; and a readout module configured to read out at least some of the measurement data from the at least one database.

In another embodiment of the apparatus, the result tensor calculation module is configured to use an alternating least-squares method, wherein the transformation tensor, the relationship tensor and the weighting tensor are updated alternatingly until convergence.

According to a further aspect, a system for calculating a relation indicator for a relation between entities includes: (1) a number, N, of entities; (2) a measurement tensor module configured to provide a measurement tensor X of measurement tensor components, $X_{ijk}$, with i, j=1 . . . N, including measurement data as relation indicators, wherein the relation indicator $X_{ijk}$ indicates a k-th relation between an i-th and a j-th of the number of entities; (3) a rules tensor module configured to provide a rules tensor M of rules tensor components, $M_{ijn}$, describing a prediction of an n-th rule; (4) a weighting tensor module configured to calculate a weighting tensor W of weighting tensor components, $W_{nk}$, indicating relative weights of the rules for the k-th relation between the entities; (5) a relationship tensor module configured to calculate a relationship tensor R of relationship tensor components, $R_{abk}$, with a, b=1 . . . r, indicating relations between a set of a number, r, of properties of the entities; (6) a transformation tensor module configured to calculate a transformation tensor A of transformation tensor components, $A_{ia}$, describing the i-th entity via r latent properties, wherein the transformation tensor A, the weighting tensor W, and the relationship tensor R are calculated as the minimum solutions to the following equation:

$$\min_{A,R,W} \|X_{ijk} - X'_{ijk}\|_F^2 + \lambda_A \|A\|_F^2 + \lambda_R \|R\|_F^2 + \lambda_W \|W\|_F^2,$$

with $\lambda_A$, $\lambda_R$, and $\lambda_W$ as Lagrange parameters and with $X_{ijk}'$ given by $$X_{ijk}' = \Sigma_{a,b,n}(A_{ia}R_{abk}A_{bj}^T + M_{ijn}W_{nk}),$$

where $A^T$ is the transposed tensor corresponding to the transformation tensor A; (7) a result tensor calculation module configured to calculate the result tensor X' of the result tensor components $X_{ijk}'$; and (8) a relation indicator calculation module configured to calculate a value of the relation indicator for a k-th relation between an i-th and a j-th entity based on the result tensor component $X_{ijk}'$.

In another embodiment of the system, at least one of the entities is a sensor, an actuator, a field device, a controller, a display, and/or a section of a conveyer belt assembly.

In another embodiment of the system, the system includes a control signal generation module configured to generate at least one control signal, based on the predicted value of the relation indicator, for controlling at least one of the entities of the system.

The number of latent variables in tensor factorization is determined via the number of latent components used in the factorization, which in turn is bounded by the factorization rank. While tensor and matrix factorization algorithms may scale well with the size of the data, which is one reason for their appeal, the algorithms may not scale well with respect to the rank of the factorization. Hence, the tensor rank is a central parameter of factorization methods that determines generalization ability as well as scalability.

A possible method has been proposed in document M. Nickel, X. Jiang, and V. Tresp, "Reducing the Rank in Relational Factorization Models by Including Observable Patterns," in Advances in Neural Information Processing Systems 27, Curran Associates, Inc., 2014, pp. 1179-1187.

In a possible embodiment, use is made of a tensor model, called ARE (Additive Relational Effects), proposed in the paper above, which is herein incorporated by reference. The ARE model combines the strong relational learning ability and the good scalability of the RESCAL model with the linear regression model, which may deal with observed patterns to model known relations. It has been shown in the paper cited above that the method used in the embodiments of is substantially faster as compared to state of the art methods, in particular over pure latent variable methods. The proposed method used in the embodiments reduces the required rank of the tensor significantly.

Therefore, an advantage of the present embodiments is that runtime and memory complexity is significantly reduced.

Another advantage of the method is that as it works fast, it is possible to react faster to certain events according to the predictions of the method.

DETAILED DESCRIPTION

The following terms shall have, for the purposes of this application, the respective meanings set forth below.

A "tensor" is an array of values having two or more dimensions. A two-dimensional tensor A has components $A_{ij}$, a three-dimensional tensor R has components $R_{ijk}$, and so on.

A "factorization model" is a mathematical model used to cluster items.

A "transposed tensor" $A^T$ corresponding to a two-dimensional tensor A with components $A_{ij}$ is the two-dimensional tensor with components $A_{ij}^T = A_{ji}$.

The value $\|A\|_F^2 = \Sigma_{ij} A_{ij}^2$ is the "Frobenius norm" of the two-dimensional tensor A, and the value $\|R\|^2 = \Sigma_{ijk} R_{ijk}^2$ is the "Frobenius norm" of the three-dimensional tensor R.

Figure 1:
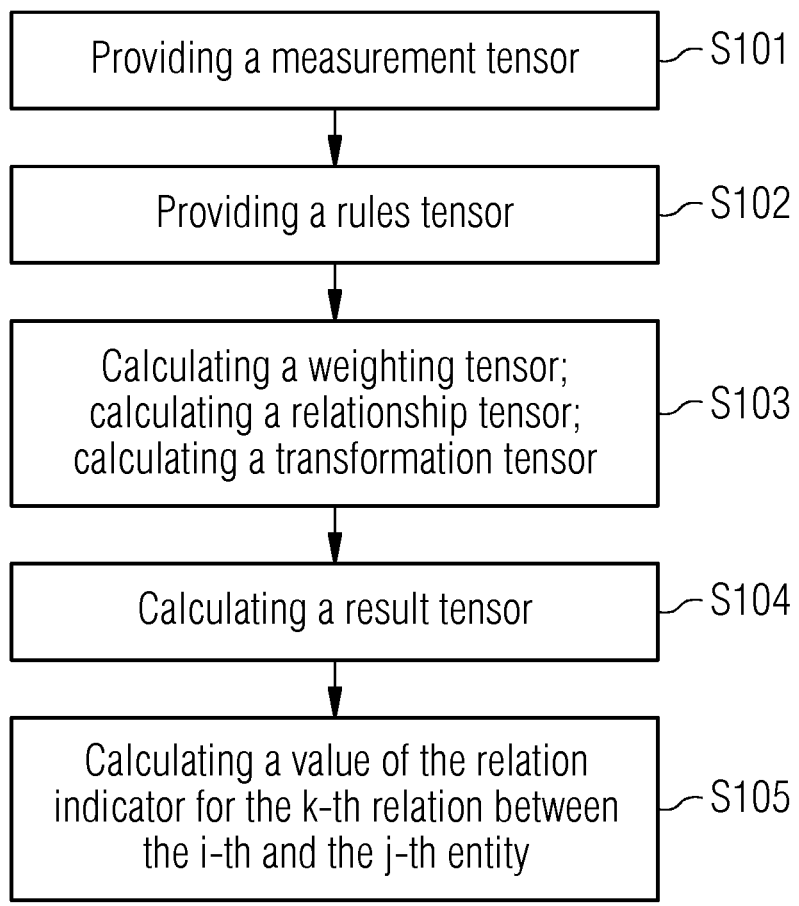
FIGS. 1 to 3 depict flow charts of exemplary methods for calculating a relation indicator for relations between entities.

Referring now to FIG. 1, an exemplary method for calculating a relation indicator for a relation between entities is depicted. The method deals with a number N of entities, where the integer N is not restricted. In particular, N may be a large number.

In act S101, a measurement tensor X is provided, where the measurement tensor has measurement tensor components, $X_{ijk}$, with i, j=1 ... N and k=1 ... K. The measurement tensor components, $X_{ijk}$, are real values. The measurement data includes data as relation indicators, wherein the relation indicator $X_{ijk}$ indicates a k-th relation between the i-th and the j-th entities out of the N entities.

The measurement tensor components, $X_{ijk}$, may be provided, at least partially, by a sensor, (e.g., an optical sensor), which is able to perform measurements on the entities. The measurement tensor components, $X_{ijk}$, may also be provided, at least partially, on at least one database or they may be obtained via an interface or over a network such as the internet.

The size of the value of the relation indicator $X_{ijk}$ corresponds to the strength of the k-th relation between the i-th and the j-th entity. For instance a correlation value corresponding to the k-th relation between the i-th and j-th value may be used as relation indicator $X_{ijk}$.

In act S102, a rules tensor M is provided having rules tensor components $M_{ijn}$, with i, j=1 ... N and n=1 ... P for a given integer P, which is the total number of rules. The rules tensor components $M_{ijn}$ may include deterministic dependencies between the i-th and j-th entity or confidences values or probabilities that a relationship exists between the i-th and j-th entity corresponding to the n-th rule. The rule tensor components may involve link prediction heuristics such as Common Neighbors, Katz Centrality, or Horn clauses.

In act S103, a weighting tensor W of weighting tensor components, $W_{nk}$ is calculated, with n=1 ... P and k= 1 ... K. The weighting tensor components $W_{nk}$ correspond to the relative weight of the n-th rule for the k-th relation between the entities. For instance, it may indicate how much the n-th rule correlates with the k-th relation. In addition, a relationship tensor R is calculated with relationship tensor components, $R_{abk}$, with a, b=1 ... r and k=1 ... K, where the integer r is the number of a given set of properties of the entities. The relationship tensor component $R_{abk}$ indicates the k-th relation between the a-th and the b-th property. Further, a transformation tensor A is calculated with transformation tensor components, $A_{ia}$, with i=1 ... N and a= 1 ... r, which describe the i-th entity via r latent properties.

Herein, the transformation tensor A, the weighting tensor W, and the relationship tensor R are calculated as the minimum solutions to the following equation:

$$\min_{A,R,W} \|X_{ijk} - X_{ijk}'\|_F^2 + \lambda_A \|A\|_F^2 + \lambda_R \|R\|_F^2 + \lambda_W \|W\|_F^2,$$

where $\lambda_A$, $\lambda_R$, and $\lambda_W$ are Lagrange parameters and with result tensor components $X_{ijk}'$ of a result tensor X' given by:

$$X_{ijk}' = \Sigma_{a,b,n}(A_{ia} R_{abk} A_{bj}^T + M_{ijn} W_{nk}),$$

where $A^T$ is the transposed tensor corresponding to the transformation tensor A. The first term of $X_{ijk}'$ in the above formula may be considered as a RESCAL procedure, which is a state-of-the-art relational learning method that is based on a constrained Tucker decomposition. The second term of $X_{ijk}'$ in the above formula corresponds to a linear regression model.

Solving an optimization problem with Lagrange parameters (also called Lagrange multipliers) may be done, for instance, via alternating least-squares, which is a block-coordinate optimization method in which the transformation tensor A, the relation tensor R, and the weighting tensor W are updated alternatingly until convergence. In particular, the initial value for the transformation tensor A, the weighting tensor W, and the relationship tensor R may be chosen according to the problem. For instance, the initial values for the components of the transformation tensor A, the weighting tensor W, and the relationship tensor R may be chosen to be random numbers.

In act S104, a result tensor X' with result tensor components, $X_{ijk}'$, with i, j=1 . . . N and k=1 . . . K is computed by inserting the solutions for the transformation tensor A, the weighting tensor W, and the relationship tensor R as calculated in act S103 into the above formula for the result tensor X'.

In act S105, a value of the relation indicator for the k-th relation between the i-th and the j-th entity is computed, based on the result tensor component $X_{ijk}'$. For instance, the strength of the k-th relation between the i-th and the j-th entity may be equal to the result tensor component $X_{ijk}'$.

Figure 2:
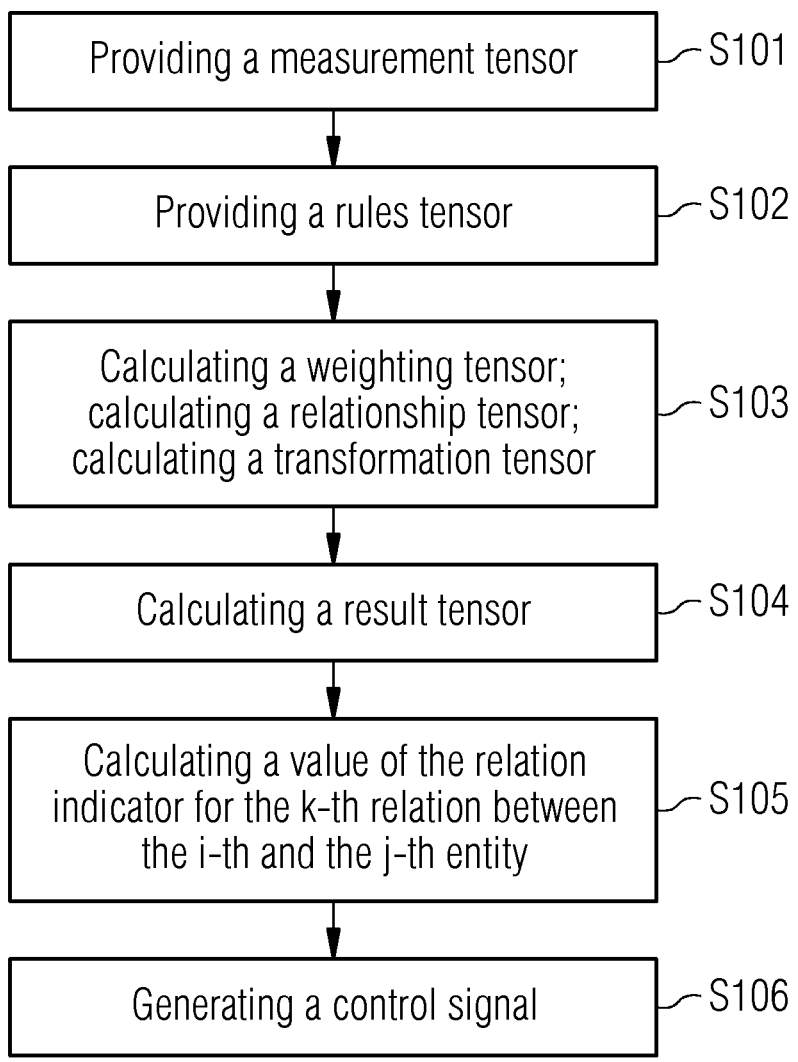

According to a further embodiment, the method for calculating a relation indicator for a relation between entities includes an additional act S106, as depicted in FIG. 2, of generating at least one control signal, based on the predicted value of the relation indicator. For instance, the result tensor component X' may be taken as an input for generating a control signal, for controlling an actuator, a sensor, a controller, a field device and/or a display. In particular, a visual signal and/or an acoustic signal may be created. For instance, the computed result tensor X' or selected elements of the result tensor component $X_{ijk}'$ may be prompted on a screen.

Figure 3:
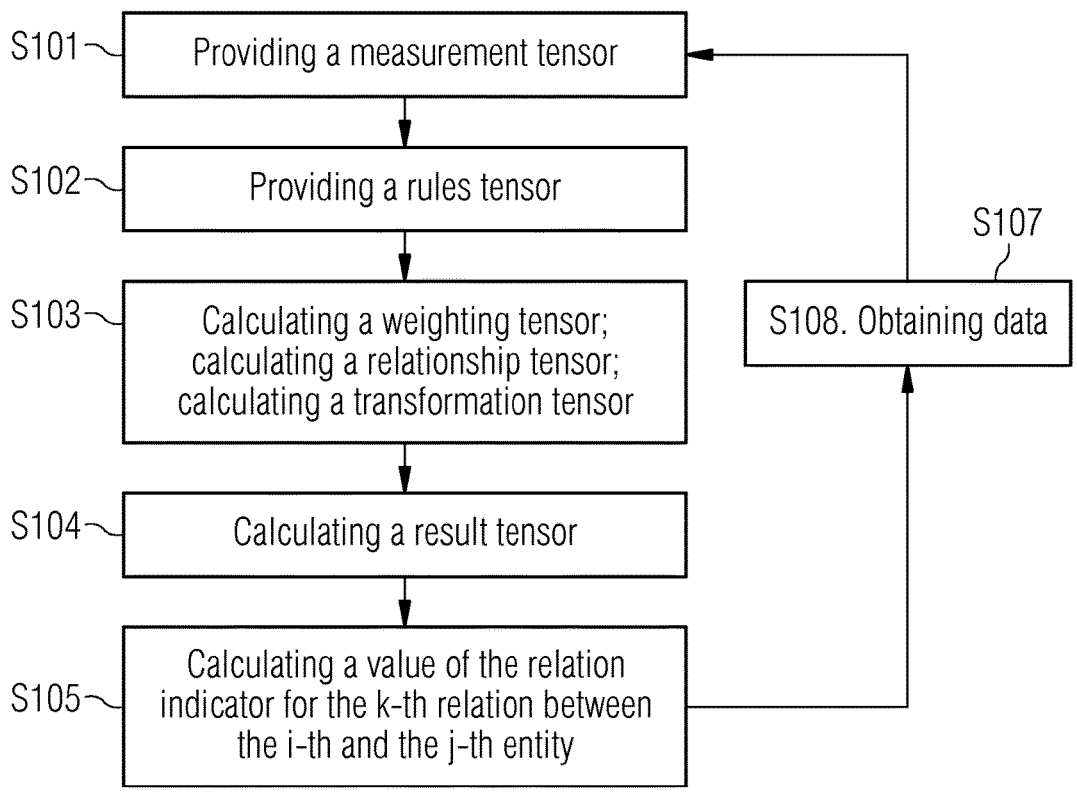

According to a further embodiment, as depicted in FIG. 3, the process involves after act S105 an additional act S107 of obtaining data. The data may contain new values for the relations between the entities. For example, at least one relation between at least two of the entities may be monitored.

After act S107, the method may jump back to act S101, where the corresponding measurement tensor components of the measurement tensor X may be replaced by new measurement tensor components based on the data obtained in act S107.

According to a further embodiment, the data obtained in act S107 may correspond to a new entity and may in particular involve relations between the new entity and the entities already present in the method (the old entities). After act S107, the method starts again with act S101. Now, the measurement tensor X includes measurement tensor components, $X_{ijk}$, with i, j=1 . . . N+1, where the measurement tensor components $X_{ijk}$, with i, j=1 . . . N are equal to the result tensor component $X_{ijk}'$ computed in act S106. For each k=1 . . . k, the additional measurement tensor components $X_{(N+1)jk}$, with j=1 . . . N+1 and $N_{i(N+1)k}$, with i=1 . . . N are determined based on the data obtained in act S108. If no data was obtained for certain measurement tensor components, the respective measurement tensor components may be set to a predetermined value, for instance 0.

Likewise in act S102, the rules tensor M has rules tensor components, $M_{ijn}$, with i, j=1 . . . N+1, where the rules tensor components $M_{ijn}$, with i, j=1 . . . N are equal to old rules tensor component $M_{ijn}$, from the previous act S102, while the additional rules tensor components $M_{(N+1)jn}$, with j= 1 . . . N+1 and $M_{i(N+1)n}$, with i=1 . . . N are determined based on the data obtained in act S107. If no data was obtained for certain measurement tensor components, the respective measurement tensor components may be set to a predetermined value, for instance 0.

The following acts are performed with the respective dimensions of the tensors adjusted. In particular, in act S106, a result tensor X' with result tensor components $X_{ijk}'$ for i, j=1 . . . N+1 is computed.

The method according may be implemented in hardware, firmware, software, or a combination of the three. The method may be implemented in a computer program executed on a programmable computer having a processor, a data storage system, volatile and non-volatile memory, and/or storage elements, at least one input device and at least one output device.

Each such computer program may be stored on a storage media or device (e.g., hard disk drive, floppy disk drive, read only memory (ROM), external or internal CD-ROM device, flash memory device, a USB drive, digital versatile disk (DVD), or other storage device) readable by a general or special purpose programmable computer system, for configuring and operating the computer system when the storage media or device is read by the computer system to perform the procedures described herein. Embodiments may also be considered to be implemented as a machine-readable storage medium, configured for use with a computer system, where the storage medium so configured causes the computer system to operate in a specific and predefined manner to perform the functions described herein.

Figure 4:
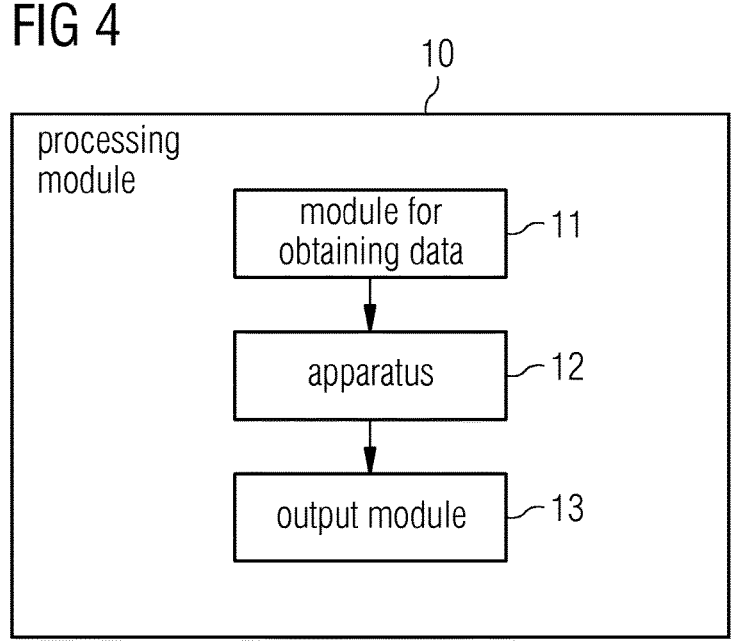
FIG. 4 depicts an exemplary processing module.

FIG. 4 depicts a processing module 10. The processing module 10 contains a module for obtaining data 11, which might in particular include sensors or interfaces to other modules or to a network such as the internet. The processing module 10 further includes an apparatus 12, which is designed to perform the method as described above.

Figure 5:
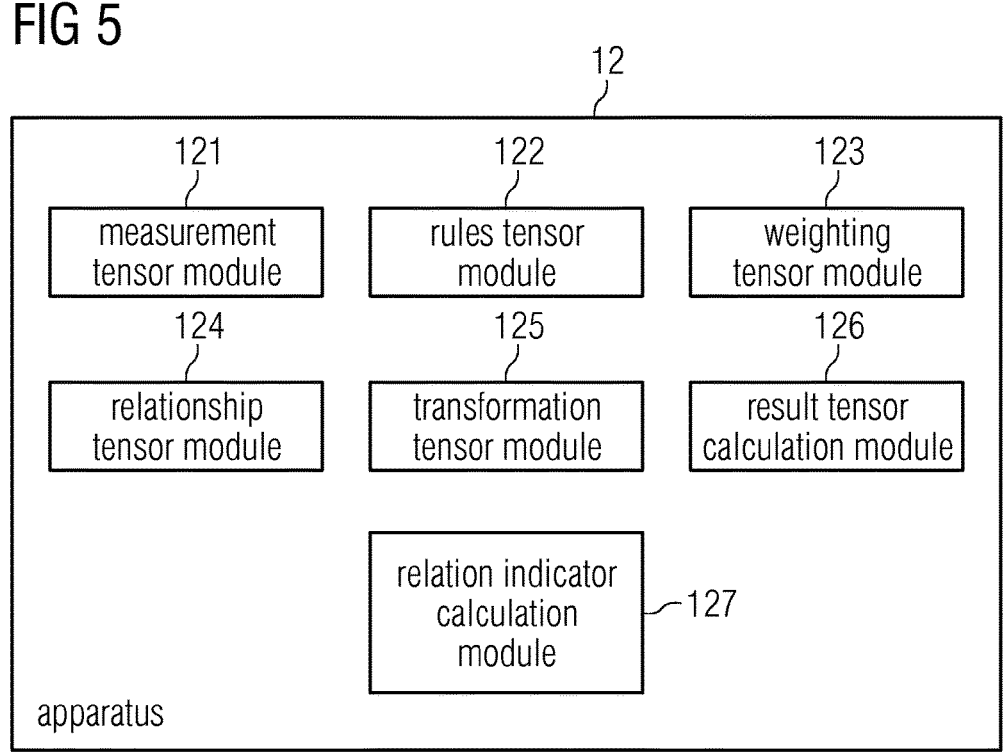
FIG. 5 depicts an exemplary apparatus for calculating a relation indicator for a relation between entities.

In more detail, as depicted in FIG. 5, the apparatus 12 includes a measurement tensor module 121 configured to provide a measurement tensor X, a rules tensor module 122 configured to provide a rules tensor M, a weighting tensor module 123 configured to calculated a weighting tensor W, a relationship tensor module 124 configured to calculate a relationship tensor R, a transformation tensor module 125 configured to provide a transformation tensor A, a result tensor calculation module 126 configured to calculate a result tensor X', and a relation indicator calculation module 127 configured to calculate a value of the relation indicator for the k-th relation between the i-th and the j-th entity.

The measurement tensor X, the rules tensor M, the weighting tensor W, and the relationship tensor R may all at least partially be based on the input from the module for obtaining data 11, but the embodiments are not limited to this case.

The processing module 10 further includes an output module 13, which generates an output based on the relation indicator that has been calculated by the apparatus 12. The output module may include an interface, such as a screen, or an acoustic or visual signal generator.

The apparatus is not limited to the described processing module 10. In particular, the apparatus 12 may exist as a unit by itself.

As a first example, a method to study buying behavior in an online shopping platform is discussed. The entities involve all or a selection of costumers that are registered at the shopping platforms, and all or a selection of products that may be purchased on the shopping platform.

The measurement tensor X contains a set of K relations between the entities (e.g., costumers and products). As an example, the k-th relation may be how often a costumer has already purchased a certain product. The measurement tensor components $X_{ijk}$ is equal to the number of times the product has been purchased for a costumer i and a product j and is set to zero, when both i and j refer to costumers or both i and j refer to products. As another example, the value of the measurement tensor components $X_{ijk}$ for costumers i and j may include how closely the costumers i and j are linked, for instance on a social platform (with $X_{ijk}$ set to zero for i and/or j referring to a product). Further examples for relations may be how often the costumer has already searched for the particular product, or how often particular products are purchased together.

An example for a rule appearing in a rules tensor may be that a travel guide for a certain country is likely purchased together with a travel to that country, thus assigning a high value to the corresponding rules tensor component.

Often, a certain entry, say $X_{ijk}$, of the measurement tensor X is not known and will be set to zero in a first approximation. With the method described above, it is possible to compute the result tensor X', whose components are now to be considered to be better approximations to the real situation. Therefore the result tensor component $X_{ijk}'$ is used as a prediction for the value of the k-th relation between the i-th and the j-th product. For instance, it is possible to make a prediction, how likely a certain costumer will purchase a certain product.

The method may be used for medical treatment. In this case, the entities include a set of patients, a set of treatments, and a set of diseases. A k-th relation may be how many units of a certain treatment a certain patient gets per day, so if i refers to a patient and j to a treatment, $X_{ijk}$ is set equal to the number of units of treatment j, which a patient i gets per day. If j refers to a patient and i to a treatment, $X_{ijk}$ is also set equal to the number of units of treatment i, which a patient j gets per day. All other entries $X_{ijk}$ for i and j not being a patient and a treatment are set to zero. Another relation may involve a quantification of the kinship between the patients.

A rule may involve the correlation between diseases and medication, for instance, based on empirical data.

If now the number of units of a certain treatment j a patient i gets per day is to be determined, the corresponding value of the measurement tensor X, say $X_{ijk}$, will be set to zero in a first approximation. With the method described above, the result tensor X' is computed and the respective result tensor component $X_{ijk}'$ is used as a prediction for how many units of the treatment j the patient i may get.

For example, the method may also involve a production process in a factory. The entities include a set of units, such as robots, machines, sensors, controlling units, and the like. A possible relation may be how likely certain units are activated together. Another possible relation is how likely it is that a malfunction of two given units shows up at the same time. If this relation is unknown for two certain units, it may be set to a predetermined value, for instance 0. Once the corresponding component $X_{ijk}'$ of the result tensor is computed, the relation between said two units may be predicted. If the value $X_{ijk}'$ is high, it is likely that after a malfunction in a first of the two said units has occurred, also a malfunction of the second unit will occur. Given that it has been detected that a malfunction of one of the two said units has occurred, a warning signal may be given to a user. Alternatively, an automatic replacement may be initiated, for instance by a control unit.

The embodiments are not limited to these examples. In particular, the method may be used to control devices in a car or in the context of Internet of things (IoT) technologies.

As another use case of the method, a manufacturing method with a set of conveyor bands may be used. In this case, the entities are the different conveyor bands. An example of a relation may be how often a malfunction of a certain conveyor band appears together with a malfunction of another conveyor band. Another example may be how often a certain conveyor band is activated, once another conveyor band is activated. A rule may be that a first conveyor band is deactivated, once a second conveyor band is deactivated (for instance, because the first conveyor band is located directly behind the second conveyor band). If the relation of how often a first conveyor band malfunctions if a second conveyor band malfunctions is unknown, its corresponding value in the measurement tensor may be set to zero. The result tensor is computed with the method and the predicted relation may be obtained from the respective component of the result tensor. If the second conveyor band malfunctions, a signal may be given based on the computed relation. For instance, a warning light may be turned on or a message may be prompted to a user.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" refers to "including, but not limited to."

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for calculating a relation indicator for a relation between entities, the method comprising:
   providing a measurement tensor X of measurement tensor components, $X_{ijk}$, with i, j=1 . . . N, comprising measurement data as relation indicators, wherein the relation indicator $X_{ijk}$ indicates a k-th relation between an i-th and a j-th of a number, N, of entities;

providing a rules tensor M of rules tensor components, $M_{ijn}$, describing a prediction of an n-th rule;

calculating, by a processor, a weighting tensor W of weighting tensor components, $W_{nk}$, indicating relative weights of the rules for the k-th relation between the entities;

calculating, by a processor, a relationship tensor R of relationship tensor components, $R_{abk}$, with a, b=1 . . . r, indicating relations between a set of a number, r, of properties of the entities;

calculating, by a processor, a transformation tensor A of transformation tensor components, $A_{ia}$, describing the i-th entity via r latent properties, wherein the transformation tensor A, the weighting tensor W, and the relationship tensor R are calculated as minimum solutions to the following equation:

$$\min_{A,R,W} \|X_{ijk} - X'_{ijk}\|_F^2 + \lambda_A \|A\|_F^2 + \lambda_R \|R\|_F^2 + \lambda_W \|W\|_F^2,$$

with $\lambda_A$, $\lambda_R$, and $\lambda_W$ as Lagrange parameters and with result tensor components $X_{ijk}'$ of a result tensor X' given by:

$$X_{ijk}' = \Sigma_{a,b,n}(A_{ia}R_{abk}A_{bj}^T + M_{ijn}W_{nk}),$$

where $A^T$ is the transposed tensor corresponding to the transformation tensor A;

calculating, by a processor, a value of the relation indicator for the k-th relation between the i-th and the j-th entity based on the result tensor component $X_{ijk}'$, wherein the calculating of the the relation indicator provides an improved processor runtime and reduced memory complexity in comparison to calculating a relation indicator via a pure latent variable method by reducing a required rank of a tensor;

generating, by the processor, at least one control signal, based on the predicted value of the relation indicator; and controlling, by the processor, one or more of an actuator, a sensor, a controller, a field device, or a display using the generated control signal.

2. The method of claim 1, further comprising:
creating, by the processor, a visual signal, an acoustic signal, or the visual and the acoustic signal based on the generated control signal.

3. The method of claim 1, further comprising:
expanding the measurement tensor with additional measurement tensor components $X_{i(N+1)k}$ for i=1 . . . N, $X_{(N+1)jk}$ for j=1 . . . N, and $X_{(N+1)(N+1)k}$, comprising measurement data as relation indicators between the (N+1)-th additional entity and the entities; and
expanding the rules tensor with additional rules tensor components, $M_{i(N+1)n}$ for i=1 . . . N, $M_{(N+1)jn}$ for j= 1 . . . N and $M_{(N+1)(N+1)n}$,
wherein a value of a relation indicator to be predicted is set to a predetermined value.

4. The method of claim 1, further comprising:
monitoring a relation between at least two of the entities; and
setting a value of at least one relation indicator based on the monitored relation between the at least two of the entities.

5. The method of claim 1, wherein at least some of the measurement data are provided by at least one sensor, are read out from at least one database, or are both provided by the at least one sensor and read out from the at least one database.

6. The method of claim 1, wherein the calculating of the result tensor comprises using an alternating least-squares method, wherein the transformation tensor, the relationship tensor, and the weighting tensor are updated alternatingly until convergence.

7. An apparatus for calculating a relation indicator for a relation between entities, the apparatus comprising:

a measurement tensor module configured to provide a measurement tensor X of measurement tensor components, $X_{ijk}$, with i, j=1 . . . N, comprising measurement data as relation indicators, wherein the relation indicator $X_{ijk}$ indicates a k-th relation between an i-th and a j-th of a number, N, of entities;

a rules tensor module M configured to provide a rules tensor of rules tensor components, $M_{ijn}$, describing a prediction of an n-th rule;

a weighting tensor W module configured to calculate a weighting tensor W of weighting tensor components, $W_{nk}$, indicating relative weights of the rules for the k-th relation between the entities;

a relationship tensor module configured to calculate a relationship tensor R of relationship tensor components, $R_{abk}$, with a, b=1 . . . r, indicating relations between a set of a number, r, of properties of the entities;

a transformation tensor module configured to calculate a transformation tensor A of transformation tensor components, $A_{ia}$, describing the i-th entity via r latent variables, wherein the transformation tensor A, the weighting tensor W, and the relationship tensor R are calculated as minimum solutions to the following equation:

$$\min_{A,R,W} \|X_{ijk} - X'_{ijk}\|_F^2 + \lambda_A \|A\|_F^2 + \lambda_R \|R\|_F^2 + \lambda_W \|W\|_F^2,$$

with $\lambda_A$, $\lambda_R$, and $\lambda_W$ as Lagrange parameters and with result tensor components $X_{ijk}'$ of a result tensor X' given by:

$$X_{ijk}' = \Sigma_{a,b,n}(A_{ia}R_{abk}A_{bj}^T + M_{ijn}W_{nk}),$$

where $A^T$ is the transposed tensor corresponding to the transformation tensor A;

a result tensor calculation module configured to calculate a result tensor X' of result tensor components, $X_{ijk}'$;

a relation indicator calculation module configured to calculate a value of the relation indicator for the k-th relation between the i-th and the j-th entity based on the result tensor component $X_{ijk}'$; and a control signal generation module configured to generate at least one control signal, based on the predicted value of the relation indicator, and control one or more of an actuator, a sensor, a controller, a field device, or a display, wherein the apparatus is configured to provide improved processor runtime and reduced memory complexity in comparison to an apparatus calculating a relation indicator via a pure latent variable method by reducing a required rank of a tensor.

8. The apparatus of claim 7, further comprising:
an output module configured to create a visual signal, an acoustic signal, or the visual signal and the acoustic signal based on the generated control signal.

9. The apparatus of claim 7, further comprising:
a measurement tensor expansion module configured to: (1) expand the measurement tensor with additional measurement tensor components $X_{i(N+1)k}$ for i=1 ... N, $X_{(N+1)jk}$ for j=1 ... N and $X_{(N+1)(N+1)k}$, comprising measurement data as relation indicators between the (N+1)-th additional entity and the entities, and (2) set a value of a relation indicator to be predicted to a predetermined value; and
a rules tensor expansion module configured to expand the rules tensor with additional rules tensor components, $M_{i(N+1)n}$ for i=1 ... N, $M_{(N+1)jn}$ for j=1 ... N and $M_{(N+1)(N+1)n}$.

10. The apparatus of claim 7, further comprising:
a monitoring module configured to monitor a relation between at least two of the entities; and
a setting module configured to set a value of at least one relation indicator based on the monitored relation between the at least two of the entities.

11. The apparatus of claim 7, further comprising:
a measurement module configured to provide at least some of the measurement data to the measurement tensor module.

12. The apparatus of claim 7, further comprising:
at least one database; and
a readout module configured to read out at least some of the measurement data from the at least one database.

13. The apparatus of claim 7, wherein the result tensor calculation module is configured to use an alternating least-squares method, wherein the transformation tensor, the relationship tensor, and the weighting tensor are updated alternatingly until convergence.

14. A system for calculating a relation indicator for a relation between entities, the system comprising:
a number, N, of entities;
a measurement tensor module configured to provide a measurement tensor X of measurement tensor components, $X_{ijk}$, with i, j=1 ... N, comprising measurement data as relation indicators, wherein the relation indicator $X_{ijk}$ indicates a k-th relation between an i-th and a j-th of the number of entities;
a rules tensor module configured to provide a rules tensor M of rules tensor components, $M_{ijn}$, describing a prediction of an n-th rule;
a weighting tensor module configured to calculate a weighting tensor W of weighting tensor components, $W_{nk}$, indicating relative weights of the rules for the k-th relation between the entities;
a relationship tensor module configured to calculate a relationship tensor R of relationship tensor components, $R_{abk}$, with a, b=1 ... r, indicating relations between a set of a number, r, of properties of the entities;
a transformation tensor module configured to calculate a transformation tensor A of transformation tensor components, $A_{ia}$, describing the i-th entity via r latent properties, wherein the transformation tensor A, the weighting tensor W, and the relationship tensor R are calculated as minimum solutions to the following equation:

$$\min_{A,R,W} \|X_{ijk} - X'_{ijk}\|_F^2 + \lambda_A \|A\|_F^2 + \lambda_R \|R\|_F^2 + \lambda_W \|W\|_F^2,$$

with $\lambda_A$, $\lambda_R$, and $\lambda_W$ as Lagrange parameters and with result tensor components $X_{ijk}'$ of a result tensor X' given by:

$$X_{ijk}' = \Sigma_{a,b,n}(A_{ia}R_{abk}A_{bj}^T + M_{ijn}W_{nk}),$$

where $A^T$ is the transposed tensor corresponding to the transformation tensor A;
a result tensor calculation module configured to calculate a result tensor X' of result tensor components, $X_{ijk}'$;
a relation indicator calculation module configured to calculate a value of the relation indicator for the k-th relation between the i-th and the j-th entity based on the result tensor component $X_{ijk}'$; and
a control signal generation module configured to generate at least one control signal, based on the predicted value of the relation indicator, and control at least one of the entities of the system,
wherein the system is configured to provide improved processor runtime and reduced memory complexity in comparison to a system calculating a relation indicator via a pure latent variable method by reducing a required rank of a tensor.

15. The system of claim 14, wherein at least one of the entities is a sensor, an actuator, a field device, a controller, a display, or a section of a conveyer belt assembly.

* * * * *